United States Patent
Wolf

[11] 3,730,202
[45] May 1, 1973

[54] METHOD OF CONTROLLING AN INTERFACE BETWEEN TWO FLUIDS

[76] Inventor: Gerhard H. Wolf, 23 Ungererstr. 248, Munich, Germany

[22] Filed: Aug. 31, 1970

[21] Appl. No.: 68,231

[30] Foreign Application Priority Data

Nov. 12, 1969 Germany..................P 19 56 938.1

[52] U.S. Cl....................................................137/13
[51] Int. Cl............................................F17d 1/16
[58] Field of Search................................137/1, 13

[56] References Cited

UNITED STATES PATENTS 3,334,641  8/1967  Bjornsen ...........................137/13

Primary Examiner—Alan Cohan

[57] ABSTRACT

An interface between two fluids of different densities in the presence of an acceleration, $g$, tending to distort said interface, is controlled by oscillating the system of fluids in a direction essentially normal to the interface. The parameters of oscillation are such that $$\frac{b_m}{g} \geq -\frac{\sqrt{8}\,\pi f}{\Omega_0}$$

wherein $b_m$ is the maximum acceleration of the interface due to the oscillation $f$ is the oscillation frequency $\Omega_0$ is the slowest eigenmode of the system of fluids.

The interface may be a lower surface of a body of liquid, the other fluid being a gas, and the parameters of the oscillation may be controlled such that rain-like droplets are expelled from the otherwise stabilized surface.

10 Claims, 3 Drawing Figures

Patented May 1, 1973 3,730,202
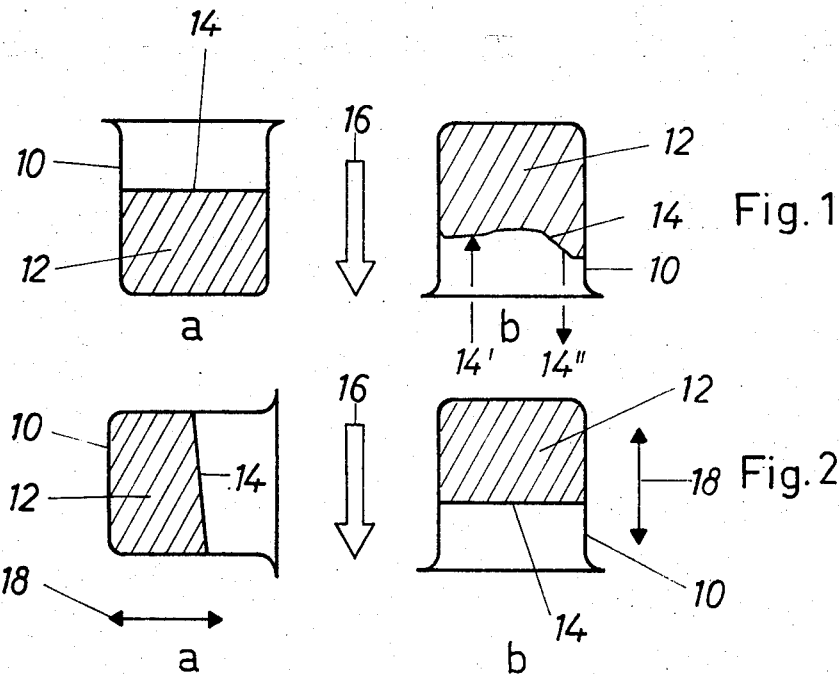
Fig. 1
Fig. 2
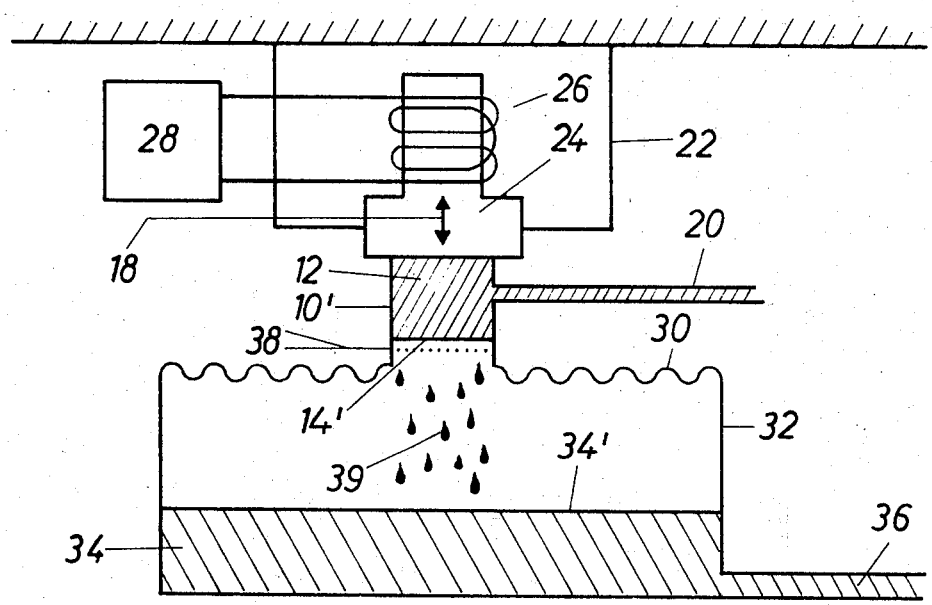
Fig. 3

METHOD OF CONTROLLING AN INTERFACE BETWEEN TWO FLUIDS

This invention relates to a method of controlling an interface between a first body of fluid of predetermined density, $\sigma_1$, and a second body of fluid having a density, $\sigma_2$, which is lower than said predetermined density $\sigma_1$, in the presence of an acceleration, $g$, tending to distort said interface substantially, said first body being enclosed by a wall of a vessel and said interface bounded by said wall.

One object of the invention is to provide a method of stabilizing a surface of a body or liquid against gravity or acceleration forces which may tend to distort and/or disrupt the surface. Another object of the invention is to provide a method of forming two opposed and spaced liquid/gas interfaces.

A further object of the invention is to provide a method of forming a stable free lower surface of a body of liquid from which surface liquid droplets may be delivered in controlled amounts and sizes.

These and other objects of the invention are achieved by a method of controlling an interface between a first body of fluid of predetermined density, $\sigma_1$, and a second body of fluid having a density, $\sigma_2$, which is lower than said predetermined density $\sigma_1$, in the presence of an acceleration, $g$, tending to distort said interface substantially, said first body being enclosed by a wall of a vessel and said interface bounded by said wall which is characterized by applying an oscillatory movement to at least one of said bodies, said movement having at least a major component normal to said interface, and the maximum acceleration, $b_m$, of said interface caused by said oscillatory motion, and the frequency, $f$, of said oscillation being such that $$b_m^2/g^2 \geq 8\pi^2 f^2/\Omega_o^2$$

wherein $\Omega_o$ is the slowest eigenmode of said bodies of fluids subject to said acceleration $g$. The eigenmode $\Omega_o$ can be described by the relation $$\Omega_o^2 = m_o g (\sigma_1 - \sigma_2/\sigma_1 + \sigma_2)$$

wherein $m_o$ is a constant determined by size and shape of said boundary. In the case of said boundary being a circle of diameter D $$m_o = 3.68/D$$

while in the case of said boundary being a rectangle of maximum lateral length D'

$$m_o = \pi/D'$$

Furthermore, for achieving stabilization of said interface in the case, e.g., that said first body of fluid is a body of viscous liquid and said second body of fluid is a gas thus forming a free lower liquid surface, the valve of $b_m/g$ has to be less than about $0.5\ \eta^{2/5} f - 30$ with $\eta$ being the viscosity of the fluid having the higher viscosity of said fluids, expressed in poises. In order to produce liquid troplets emerging from said freelower liquid surface, which is otherwise stable, in controlled quantity and size, said value of $b_m/g$ has to be increased above about $0.5\ \eta^{5/2} f - 30$, wherein the frequency $f$ can be adjusted with respect to the oscillatory acceleration $b_m$.

The present method is useful, e.g., for stabilizing a free surface of a liquid on a moving vehicle, e.g., a spacecraft, or in the field of chemical technology to control the exchange of substances between two fluids which may be liquids having opposed free surfaces between which gas or vapour diffusion takes place.

The present method is furthermore useful for expelling liquids into a gaseous volume in a highly controllable way under situations, where, for instance, a nozzle is not applicable because of the pressure control required there.

Other objects, features, and advantages will appear from the following description of preferred embodiments, taken together which the attached drawings, in which:

FIG. 1 shows cross-sectional views of a cup-shaped vessel containing a liquid for explaining the socalled Rayleigh-Taylor instability.

FIG. 2 are schematic vies of the vessel shown in FIG. 1 with the free surface of the liquid being stabilized by the method according to the invention, and FIG. 3 shows an apparatus for performing an embodiment of the present method in a chemical process.

FIG. 1 $a$ shows a cup-shaped vessel 10, which contains a liquid 12, having a free surface 14. The free surface 14 of the liquid thus represents the interface between the liquid and an adjacent medium, e.g., air. The liquid is exposed to the acceleration of gravity, which is indicated by an arrow 16.

Turning vessel 10 upside down, as indicated in FIG. 1 $b$, causes the surface 14 to become unstable at a rate depending on the viscosity of the liquid, even if the original surface was plane and horizontal. The instability develops in the form of interchanging flutes or surface perturbations, which are shown at 14' and 14''. This situation has been treated theoretically by Lord Rayleigh (Scientific Papers II, 200-7, Cambridge 1,900) and by Sir G.I. Taylor (Proc. Roy. Soc. (London), A 201, 192 (1950)).

I have found that the surface of the liquid 14 can be stabilized by oscillating or reciprocating the vessel containing the liquid in a direction essentially perpendicular to the surface to be stabilized. As shown in FIG. 2 $a$ the vessel 10 may be rotated by an angle of 90° against the position of FIG. 1 $a$ without causing the liquid to flow out, although the acceleration of gravity is still acting vertically as indicated by the arrow 16. This effect is due to forced oscillations (the direction of which is indicated by doublearrow 18) of the vessel and the liquid in it. The vessel 10 can even be inverted without the liquid in it flowing out, as shown in FIG. 2 $b$.

In order to obtain this stabilization of the liquid surface with respect to the Rayleigh-Taylor instability, the oscillation parameters are subject to certain constraints, which depend on the vessel dimensions, the densities of the liquid and the adjoining medium, and on viscosity and surface tension of the liquid.

Disregarding, for the moment, the influence of viscosity and surface tension (which will be discussed later), the following stabilization condition prevails:

$$ab_m \geq 2g^2/\Omega^2 \qquad (1)$$

where
 $a$ = oscillation amplitude
 $b_m$ = maximum instantaneous acceleration due to the imparted oscillation $$= a\,\omega^2$$
$\omega = 2\pi f$
$f$ = oscillation frequency
$\Omega$ = growth rate of the perturbations of the Rayleigh-Taylor instability = eigenmode of the system of fluids.

Since the perturbation of longest possible wavelength, having the growth rate $\Omega_o$, is the most important, the value of $\Omega^2$ in eq. (1) may be replaced by $$\Omega_o^2 = m_o g \cdot (\sigma_1 - \sigma_2/\sigma_1 + \sigma_2), \quad (2)$$

where $m_o$ is a constant depending on the particular shape of the vessel $g$ is the acceleration acting on the system considered, e.g., the acceleration of gravity, $\sigma_1$ = density of the fluid to be stabilized $\sigma_2$ = density of the adjoining medium ($\sigma_1 > \sigma_2$)

The value of $m_o$ is, for a cylindrical vessel having diameter D:

$$m_{o,cyl} = 3.68/D \quad (3)$$

and for a rectangular vessel with major lateral length $D'$:

$$m_{o,rect} = \pi/D' \quad (4)$$

The resulting stability condition for instance for a cylindrical vessel is $$b_m/\omega \geq \{0.54\, gD \cdot (\sigma_1 + \sigma_2/\sigma_1 - \sigma_2)\}^{1/2} \quad (5)$$

The right-hand side of this equation contains only constants, and thus it can be re-written for a given system as $$b_m/\Omega \geq K_1. \quad (5a)$$

Furthermore it was found that a new and surprising effect arises if the left-hand side of eq. (5a) exceeds a second critical value $K_2$, which is almost independent of $\Omega$ and $b_m$ and greater than $K_1$ for not too small values of the fluid viscosity: in this case it can be achieved that small drops part from the liquid surface, which would rain down from the surface in the position shown in FIG. 2 b. The surface 14 in FIG. 2 b is then stable on a macroscopic scale, while it is unstable on a small scale for shortwevelength perturbations.

Roughly speaking, this is because, under the conditions assumed, the instabilities can grow to a degree where parts of the liquid body adjacent to the surface will achieve such a distance from the mass of the body that the next stabilizing half-cycle of oscillation becomes already ineffective.

Both the first-mentioned stabilization effect and the "rain effect" just described are useful in chemical technology, as will be explained in reference to FIG. 3.

The apparatus schematically described in FIG. 3 comprises said vessel 10' into which liquid can be supplied by a conduit 20, having a lower open end. The vessel 10' is coupled to a vibrator, indicated as block 22, which may contain an oscillating magnetic core 24 and a driving coil 26, which is excited by an A.C. voltage, adjustable in amplitude and frequency and provided by an A.C. source 28.

A diaphragm 30 may connect the lower opening of vessel 10 directly to the upper opening of a second vessel 32 containing another liquid 34 which may enter or leave the vessel by means of a conduit 36.

To facilitate operation of the apparatus described, vessel 10' may be provided with a shutter 38 which permits filling the vessel 10' while the vibrator 22 is switched off and the shutter is moved to the position indicated by dashes, thereby closing the lower open end of vessel 10'.

To put the apparaturs into operation, at first vessel 10' is filled with liquid 12, while the shutter 38 closed. Then the vibrator 22 is switched on having frequency and amplitude required for stabilization of the surface 14', and the shutter 38 is removed. The surface of the liquid 14' then remains stable without support from below. It is opposed to the surface 34' of the liquid 34, so that diffusion and exchange processes without mixing of the liquids 12 and 34 may take place. By changing the frequency and/or amplitude of the applied oscillation in such a way that the left-hand side of eq. (5a) exceeds the value $K_2$, small droplets 39 can be caused to escape the surface 14' and rain downwards.

After switching off the vibrator 22, the liquid 12 falls down. This effect may be used for the purpose of a safety switch: during normal operation, liquid 12 is introduced into liquid 34 in an exact dosage, e.g., for controlling certain chemical and/or physical reactions in liquid 34. Under anomalous operating conditions, like a power cutoff, a large quantity of liquid 12 immediately enters liquid 34, so that the reactions occuring there are interrupted or at least reduced to a safe rate.

The viscosity of liquid 12 and/or its surface tension should be taken into consideration for achieving optimum results insofar as they should secure that the surface instabilities will not grow at a rate higher than that which can be stabilized by the process described.

The method described is not limited to the stabilization of a boundary surface between a liquid and a gas but can be applied quite generally for stabilization of boundary faces between a liquid and a medium of different, especially lower, density, such as e.g., another liquid. The equations (1) to (5a) are also valid for the general case of stabilizing the interface of two fluids having different density.

If the boundary surface to be stabilized separates two liquids, they have to be substantially immiscible, otherwise no proper boundary surface could be established. Usually in this case the vessel will enclose both liquid bodies completely, unless a further interface to be stablized is present between one of the liquids and a gas.

The method of the invention may even be applied to provide a certain degree of stabilization for the interface layer between two gases of different densities. Because of the high degree of miscibility of gases, the stabilization method given here will not provide permanent stabilization, but only a temporary one, meaning a certain retardation of mixing.

Finally it may be mentioned that the method of the invention may even be employed for the formation of a connected surface or boundary layer, as occurring on separation of dispersions of two media of different density, such as oil-water emulsions.

The force causing the instabilities in the surface to be stabilized is not restricted to gravity; the method given is also applicable to instabilities arising from acceleration forces due to varying velocities, or from electric, magnetic, and/or electromagnetic forces. The method of the invention is even applicable for stabilizing a boundary surface in gravitation-free space The oscillatory motion of the medium to be stabilized may be produced in various ways: The vessel as a whole, or parts of it (e.g., the bottom designed as a piston or a membrane), may oscillate, or the first medium may be provided with an oscillating device such as a piezoelectric crystal, an elastic cavity supplied with a medium of periodically varying pressure, a heat source effecting periodic expansion or evaporation of the first medium, etc.

From the foregoing it will be apparent to those skilled in the art, that the invention herein embraces embodiments other that the embodiments described in detail and that these are within the following claims.

What is claimed is:

1. A method of controlling an interface between a first body of fluid of predetermined density, $\sigma_1$, and a second body of fluid having a density, $\sigma_2$, which is lower than said predetermined density $\sigma_1$, in the presence of an acceleration, $g$, tending to distort said interface substantially, said first body being enclosed by a wall of a vessel and said interface bounded by said wall, said method comprising the step of applying an oscillatory movement to at least one of said bodies, said movement having at least a major component nOrmal to said interface, and the maximum acceleration, $b_m$, of said interface caused by said oscillatory motion, and the frequency, $f$, of said oscillation being such that $$b_m/g \geq \sqrt{8}\,\pi f/\Omega_o$$

wherein $\Omega_o$, disregarding viscosities and surface tensions, is the slowest growth rate of the perturbations of the Rayleigh-Taylor instability of said body of fluids subject to said acceleration $g$.

2. The method according to claim 1 wherein said value of $\Omega_o$ is such that $$\Omega_o^2 = m_o g\,(\sigma_1 - \sigma_2/\sigma_1 + \sigma_2)$$

wherein $m_o$ is a constant determined by size and shape of said boundary.

3. The method according to claim 2 wherein said boundary is a circle of diameter D and $$m_o = 3{,}68/D$$

4. The method according to claim 2 wherein said boundary is a rectangle of maximum lateral length $D'$ and $$m_o = \pi/D'$$

5. The method according to claim 1 wherein at least said first body of fluid is a body of liquid.

6. The method according to claim 1 for stabilizing said interface, wherein the value of $b_m/g$ is less than about $0.5\,\eta^{2/5} f - 30$ with $\eta$ being the viscosity of the fluid having the higher viscosity of said fluids, expressed in poises.

7. The method according to claim 5 wherein said second body of fluid is provided below said body of liquid and consists of a gas, and the value of $b_m/g$ is increased above the product $2\pi f/g \cdot K_2$, wherein $K_2$ is a quantity nearly constant with respect to $f$ and $b_m$ but substantially depending on viscosity and surface tension, to produce liquid droplets emerging from said interface which is otherwise stable.

8. The method according to claim 7, wherein said quantity $K_2$ is depending mainly on the viscosity of the liquid according to the approximate relation $$2\pi/g\,K_2 = 0.5\eta^{5/2} - 30/f$$

wherein $\eta$ is the viscosity of the liquid expressed in poises.

9. The method according to claim 7 wherein said droplets can be controlled in size by varying the value of said frequency $f$ and by adjusting the value of said maximum acceleration $b_m$ such that the quantity $2\pi b_m/g\,K_2$ equals approximately the value of $f$.

10. The method according to claim 7 wherein said droplets can be controlled in quantity by the amount of which said value of $b_m/g$ is increased above about said product $2\pi f/g\,K_2$.

* * * * *